C. J. ESSELING.
DRILL.
APPLICATION FILED NOV. 8, 1915.

1,306,674.

Patented June 10, 1919.

C. J. Esseling, Inventor
By E. Croydon Marks
Attorney

UNITED STATES PATENT OFFICE.

CORNELIS J. ESSELING, OF HEERLEN, NETHERLANDS.

DRILL.

1,306,674.  Specification of Letters Patent.  Patented June 10, 1919.

Application filed November 8, 1915.  Serial No. 60,376.

*To all whom it may concern:*

Be it known that I, CORNELIS JASPER ESSELING, residing at Heerlen, the Netherlands, a subject of the Queen of the Netherlands, have invented certain new and useful Improvements in Drills, of which the following is a specification.

This invention relates to earth boring drills, of the type in which the cutting members are frusto-conical shaped and are rotatable on spindles disposed at angles to the longitudinal axis of the drill.

The principal object of my invention is to provide a drill of the type referred, which will drill a hole of a larger diameter than the external diameter of the tube through which the drill is lowered. By drilling a hole of a larger diameter than the diameter of the bore tube, the tube may be lowered in accordance with the advancement of the drill. By closely following the drill head with the tubing the falling of fragments of rock out of the sides of the bore hole into the latter is prevented, as the sides of the hole will be covered by the bore tube. The latter advantage is of great importance especially in boring holes in crumbling and fissured rock.

In drilling according to this method much less tubing of the bore hole is required. Proportionally much deeper holes may be drilled as owing to the smaller number of tubing sections to be inserted into the bore hole the diameter of the latter decreases less quickly.

The main object of my invention is obtained, by slidably mounting the individual cutting members of the drill upon their spindles.

Another object of my invention is to provide a roller drill which will drill holes of different diameters. This object is preferably obtained by inserting spacing members between the drill head and the individual cutting members. These spacing members may be of varying thickness, so as to vary the distances over which the cutting members may slide outwardly on their spindles.

A further object of my invention is to provide a drill of the above type with a separate cutting tool for cutting away the core, which may be left between the ordinary cutting members. Preferably this separate cutting tool is mounted on a spindle arranged eccentrically with regard to the axis of the drill.

Other features of my invention will be hereinafter pointed out.

My invention is illustrated on the accompanying drawing, in which.

Figure 1:
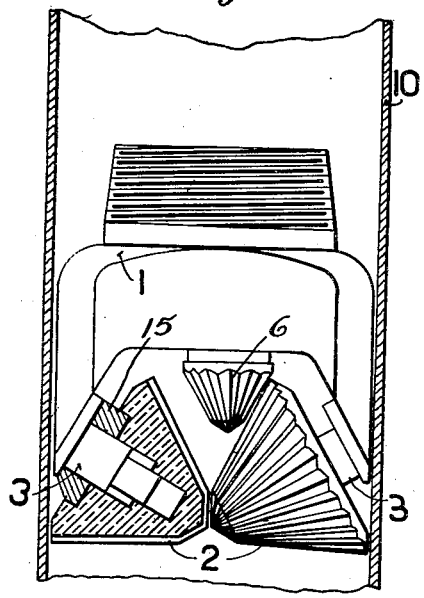
Figure 1 is a vertical sectional view of a drill in which several features of my invention are embodied, the drill being shown while it is being lowered through the bore tube.

On the drill head 1 the spindles 3 are in the usual manner arranged in such a way that they form an angle with each other and also with the longitudinal axis of the drill. The hardened steel cutting members or rollers 2 are rotatably mounted on the spindles 3. In the construction shown in Figs. 1, 2 and 4 the drill head 1 is further provided with a spindle 4 placed eccentrically with regard to the axis of the drill head. On this spindle a bronze supporting cone 5 is screwed around which cone a hardened steel cutting roller 6 is rotatably mounted.

According to my invention the rollers 2 are longitudinally slidable on the spindles 3. When the drill is lowered through the bore hole the rollers by their weight assume the position shown in Fig. 1. However, as soon as they touch the bottom of the bore hole the rollers will by the pressure exerted by the weight of the drill rods resting upon them slide apart and assume the position illustrated in Fig. 2.

If the drill head is now rotated in the usual manner, then the cutting members 2 drill a hole with a diameter 7 (Fig. 2) which is greater than the outer diameter 8 of the drill shoe attached to the lowest part of the bore tubes 10.

Figure 2:
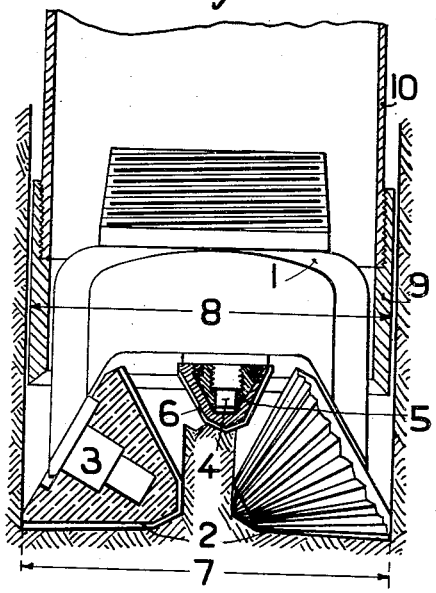
Fig. 2 shows the position of the cutting members with regard to the drill head during the drilling operation.
Figure 4:
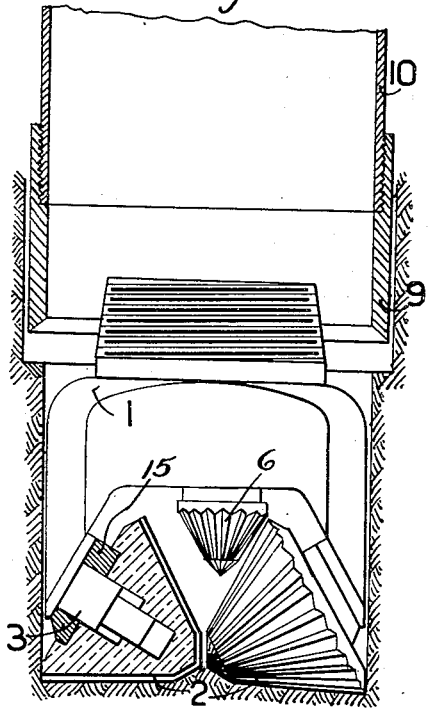
Fig. 4 shows the drill in its application as a roller drill.

In the drill illustrated by Figs. 1, 2 and 4 the material left as a core between the cutting members 2 is cut away by the steel roller 6.

Figure 3:
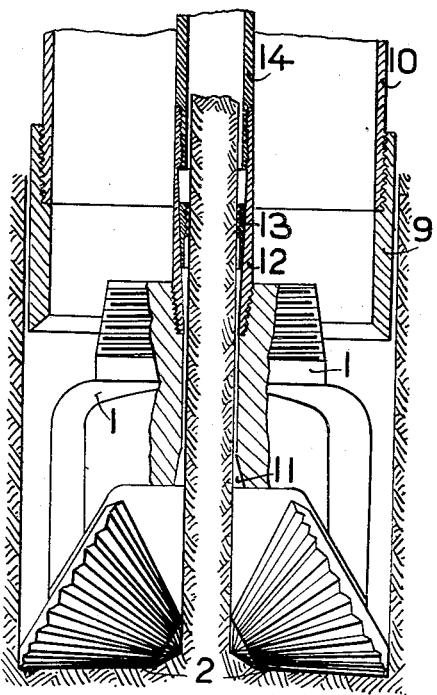
Fig. 3 shows a drill according to my invention in its application as a core drill.

In Fig. 3 the drill head 1 is provided with a central bore 11 through which the core remaining between the cutting members 2 passes. The drill head is further provided with a core catching sleeve 12 with core lifter 13 upon which sleeve the core barrel 14 is mounted. The core catching sleeve and core lifter serve in the known manner for gripping and breaking off the core and raising it to the surface, the core barrel then receiving the core.

If the drill head is only to work as a roller drill and not as a core drill then according to my invention spacing members or rings 15 are placed between the drill head 1 and the cutting members 2. In this manner a hole may be drilled having a diameter smaller than the inner diameter of the bore tube 10, while by employing spacing rings of different thickness the diameter of the hole to be drilled and the thickness of the core to be obtained may further be controlled.

Having thus described my invention, what I claim as new and desire to secure by Letters Patent is:—

1. In combination, a drill head having opposing spindles inclined toward each other and extending toward the longitudinal axis of the head, and cutting members mounted on said spindles for free axial movement and in inoperative position having their outer ends spaced away from the outer ends of the spindles, whereby in operation said cutting members can slide outwardly on said spindles and engage the walls of the drill head adjacent the outer ends of the spindles for cutting a hole of larger diameter than the drill head.

2. In combination, a drill head having opposing spindles inclined toward each other and extending toward the longitudinal axis of the head, and cutting members mounted on said spindles for free axial movement and in inoperative position resting entirely within the boundary of the interior of the tubing through which the drill head is inserted and having their outer ends spaced away from the walls supporting the outer ends of the spindles, whereby in operation said cutting members can slide outwardly on said spindles and engage the walls of the drill head adjacent the outer ends of the spindles for cutting a hole of larger diameter than the drill head.

3. In combination, a drill head having opposing spindles inclined toward each other and extending toward the longitudinal axis of the head, and frusto-conical shaped cutting members mounted on said spindles for free axial movement and in inoperative position resting entirely within the boundary of the interior of the tubing through which the drill head is inserted and having their outer ends spaced away from the outer ends of the spindles, whereby in operation said cutting members can slide outwardly on said spindles.

4. In combination, a drill head having opposing spindles inclined toward each other and extending toward the longitudinal axis of said drill head, cutting members free to slide on said spindles and coöperating with each other to drill an annular hole of greater diameter than the outer diameter of the tube through which they are lowered, and means for removing the core left between said cutting members.

5. In combination, a drill head having opposing spindles inclined toward each other and extending toward the longitudinal axis of the head, cutting members mounted on said spindles for free axial movement and in inoperative position having their outer ends spaced away from the outer ends of the spindles, whereby in operation said cutting members can slide outwardly on said spindles, and means for limiting the outward sliding movement of the cutting members.

6. In combination, a drill head having opposing spindles inclined toward each other and extending toward the longitudinal axis of said drill head, cutting members free to slide on said spindles, and means for determining the amount of the sliding movement of the cutting members away from each other.

7. In combination, a drill head having opposing spindles inclined toward each other, cutting members free to slide on said spindles and coöperating with each other to drill an annular hole of greater diameter than the outer diameter of the tube through which they are lowered, and means for determining the amount of the sliding movement of the cutting members away from each other.

8. In combination, a drill head having opposing spindles inclined toward each other and extending toward the longitudinal axis of the head, cutting members mounted on said spindles for free axial movement and in inoperative position having their outer ends spaced away from the outer ends of the spindles, whereby in operation said cutting members can slide outwardly on said spindles, and washers arranged on the spindles for limiting the outward sliding movement of the cutting members.

9. In combination, a drill head having opposing spindles inclined toward each other and cutting members free to slide on said spindles, said cutting members being hollowed out to fit over said opposing spindles, and the length of said spindles being such that the cutting members when farthest removed from the drill head are mutually held in position against falling off said spindles, said drill head being provided with means for removing the core left between said cutting members.

10. A drill, comprising a drill head, spindles projecting from said drill head and disposed at an angle to the longitudinal axis of the drill, frusto-conical shaped cutting rollers longitudinally slidable on said spindles and coöperating with each other to drill an annular hole when the drill head is rotated, spacing rings placed between the drill head and said frusto-conical shaped cutting rollers for controlling the diameter of the hole to be drilled and the diameter of the core to be obtained, and means for removing said core.

11. In combination, a drill head having opposing spindles inclined toward each other, cutting members free to slide on said spindles, and means for removing the central core left by said cutting members.

In testimony whereof I affix my signature in presence of two witnesses.

CORNELIS J. ESSELING.

Witnesses:
  H. J. KOOY,
  A. C. NELSON.